F. L. MERKLE.
GUARD CHAIN FOR PNEUMATIC TIRES.
APPLICATION FILED MAY 31, 1921.

1,422,117. Patented July 11, 1922.

Inventor:
Francis L. Merkle
by S. W. Bates
Atty

UNITED STATES PATENT OFFICE.

FRANCIS L. MERKLE, OF PORTLAND, MAINE.

GUARD CHAIN FOR PNEUMATIC TIRES.

1,422,117.  Specification of Letters Patent.  Patented July 11, 1922.

Application filed May 31, 1921. Serial No. 473,890.

*To all whom it may concern:*

Be it known that I, FRANCIS L. MERKLE, a citizen of the United States, residing at Portland, in the county of Cumberland and State of Maine, have invented certain new and useful Improvements in Guard Chains for Pneumatic Tires, of which the following is a specification.

My invention relates to a chain armor for pneumatic tires and particularly to armor for use over ice and snow in winter and for rough travelling.

The object of the invention is to construct a chain armor for automobile tires to take the place of the chains now in common use in which a substantial grip may be made on ice and snow and in soft and slippery travelling at the same time protecting the side walls of the tire from lateral wear.

According to my invention, I form a chain armor which completely surrounds the tire with links or sections hinged together at the tread with a pivotal projecting portion for taking hold on the ground, the sections extending across the tread and up on the two sides of the tire to furnish a sheathing or covering for the same.

The invention is illustrated in the accompanying drawing in which.

Figure 1:
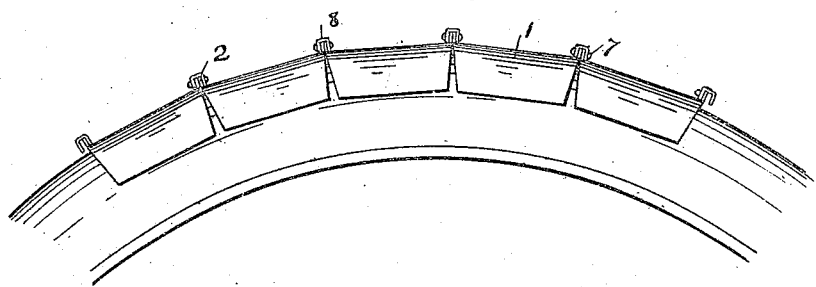
Fig. 1 is a side view of a portion of the tire with my chain armor attached.
Figure 2:
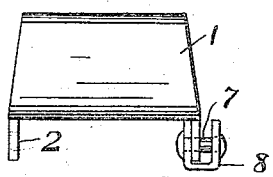
Fig. 2 is a side elevation of one of the sections.
Figure 3:
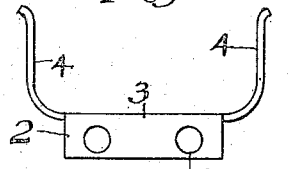
Fig. 3 is an end elevation of the same.
Figure 5:
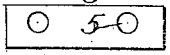
Fig. 5 is a side elevation of the U-shaped coupling.
Figure 4:
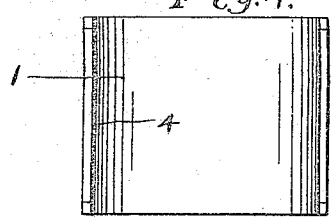
Fig. 4 is a plan.
Figure 6:
Fig. 6 is an end elevation of the same.

Referring to the drawing, 1 represents one of the sections which is preferably formed of relatively thin steel and is generally U-shaped in cross section with a bottom portion 3 and sides 4 which turn slightly outward at the top and contact with the tread and the sides of the tire respectively.

At each end of the section 1 is a downwardly projecting flange 2 by means of which the several sections are fastened together to form a continuous chain.

The flange 2 continues horizontally across the section throughout the flat or bottom portion 3, the sides 4 being connected with the flat bottom portion 3 by a curve so that the tire as it rests on the section entirely fills it. The ends of the section 1 are chamfered or bevelled to allow for a certain amount of pivotal motion, to conform to the annular form of the tire and to the limited pivotal motion taking place between the links or sections.

Adjacent ends of the sections 1 are connected together to form a chain by a U-shaped coupling 8 which fits over the edges of adjacent flanges 2.

The U-shaped coupling 8 is provided with holes 5 and the flange 2 is provided with corresponding holes 6 through which pass bolts or rivets 7 for connecting the sections together.

The holes 6 are somewhat larger than the rivet 7 so as to allow some motion within the hole 6.

The opening within the U-shaped coupling 8 is wide enough to somewhat more than allow the flanges 2 to come together so that there will be a little play longitudinally between the sections and also a little pivotal motion between the bolts and the openings through which they pass. The effect of this connection is to allow a limited pivotal connection between successive sections and to thus connect the sections together in the form of a chain with a certain amount of flexibility. The armor thus constructed is passed around the tire when the same is deflated or partially so and fastened in position by connecting the meeting sections with the coupling 8.

When the tire is inflated, the sides of the tire come firmly into contact with the sides of the sections and hold said sections from slipping.

In the use of the armor on ice or a slippery bottom, the U-couplings and the pivotal connections sink into the ice or other hard surface and secure a grip which gives an excellent bearing preventing both lateral and longitudinal slipping.

The armor is cheaply made and easily and quickly applied and practically eliminates the wear of the tire.

The straight coupling 8 beside taking a firm grip on ice or snow has a further advantage of crossing an electric car track at an angle without any slipping. Each coupling striking at its end or corner on the edge of the rail tends to ride up over it at an angle and to thereby prevent any slipping.

I claim:

1. An armor for pneumatic tires consisting of a series of hollow sections in contact, each extending across the tread and up on the sides of the tire to be held in position by lateral friction, each end of each section having a radially projecting flange, a U-shaped connecting coupling fitting over adjacent flanges, said couplings and said flanges having corresponding bolt holes with connecting bolts for securing said sections together.

2. An armor for pneumatic tires consisting of a series of hollow sections in contact, each extending across the tread and up on the sides of the tire to be held in position by lateral friction, said sections being pivoted to each other by a projecting pivotal joint, adjacent ends of said sections being cut away to allow them to approach as the radius of curvature of the tire decreases.

FRANCIS L. MERKLE.